3,410,233
METHOD FOR THE DRYING AND BURNING OF SEWAGE SLUDGE AND PLANT FOR CARRYING OUT THIS METHOD
Hermann Seiler, Zurich, Switzerland, assignor to Hermann Seiler & Sohn AG, Zurich, Switzerland
Filed Nov. 2, 1966, Ser. No. 591,551
Claims priority, application Switzerland, Nov. 3, 1965, 15,153/65
4 Claims. (Cl. 110—15)

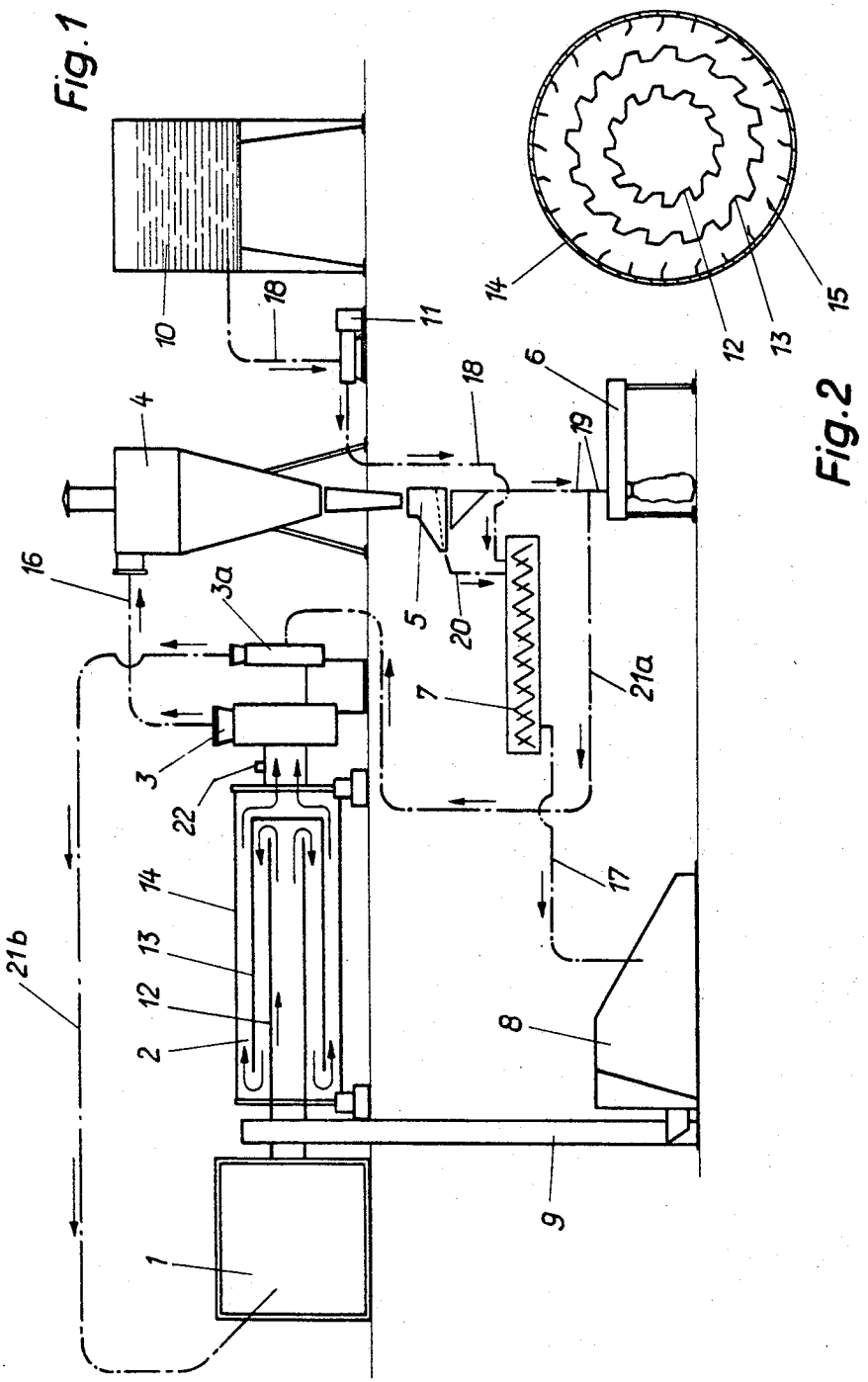

ABSTRACT OF THE DISCLOSURE

Simplified method and means for drying, and burning of sewage sludge by admixing an absorbent carrier material to the sludge, drying the mixture by evaporation, separating the dried carrier material from the dried sludge, and recycling the dried carrier material to fresh charges of sludge.

---

The present invention relates to a method for the drying and burning of sewage sludge and a plant for carrying out this method.

It is the primary object of the present invention to provide a method and plant simpler and less expensive than existing methods and plants, and accordingly suitable for smaller corporations.

With this and other objects in view which will become apparent from the following description and accompanying drawing, I provide a method for the drying and burning of sewage sludge, comprising the steps of admixing an absorbent carrier material to the sludge, drying the mixture of sludge and absorbent carrier material by evaporation, separating the dried carrier material by sifting from the dried sludge, and recycling said dried carrier material to fresh charges of sludge.

I also provide a plant for carrying out said method and comprising in combination: a furnace, a drier drum in operation heated by said furnace, a mixer in operation mixing dry carrier material with liquid sludge, a charging device transferring said mixture of sludge and carrier material in operation from said mixer to said drier drum, a separator operatively connected with the outlet of said drier drum and in operation separating the dried mixture of sludge and carrier material from the water vapor and combustion gases emerging from said drier drum, a vibrator sieve in operation separating said dried sludge from said carrier material and means returning the latter to said mixer.

These and other features of my said invention will be clearly understood from the following description of a preferred embodiment of the plant given by way of example with reference to the accompanying drawing, in which:

FIG. 1 is a diagrammatic general arrangement of a plant for the drying and burning of sewage sludge, and FIG. 2 is a transverse section on a larger scale than FIG. 1 of a drier drum as used in the plant according to FIG. 1.

The plant illustrated in FIG. 1 comprises a combustion furnace 1, which is preferably heated with residue oils and is also capable of burning dry sludge derived from the plant itself. The hot gases generated by the combustion are supplied to a rotary drum drier 2, which at its end adjacent the furnace is supplied by means of a feeder elevator 9 with a mixture of sewage sludge and an absorbent carrier material, e.g. sawdust or peat, which is derived from a charging device 8.

From the furnace-heated drier drum 2 the dried mixture together with the hot gases and water vapor passes into a fan 3, which conveys the same through a pipe 16 to a cyclone-separator 4. The latter discharges the separated water vapor and gases on top, while at the bottom the dried mixture composed of dried sludge dust and carrier material drops on a vibrator sieve 5. The latter separates the dried sludge from the carrier material. The dried sludge is passed through a pipe 19 into a bag filling device 6, where it is filled in bags for being used e.g. as fertilizer. It may alternatively be passed through a pipe 21a to a fan 3a and hence through a pipe 21b as a fuel to the combustion furnace 1.

The wet sewage sludge is connected in a tank 10 and passed through a pipe 18 and by the aid of a sludge pump 11 to the mixer 7, from where it is passed, mixed with the carrier material through a pipe 17 to the charging device 8. The carrier material is accordingly recycled and used all over again.

The drier drum 2 comprises three concentrically telescoped cylinders 12, 13, 14. As shown in FIG. 2, the outer cylinder 14 comprises inwardly directed curved vanes 15. The walls of the two inner cylinders 12 and 13 are longitudinally fluted, having a saw-tooth-like cross-sectional profile. The vanes 15 on the wall of the outermost cylinder 14 and those wall sections of the cylinders 12 and 13 which extend outwardly have substantially equal directions. The wet mixture of sludge and carrier material passes together with the hot combustion gases into the innermost cylinder, through which they flow axially in the direction of the arrows in FIG. 1.

At the right and end of the cylinder 12 the mixture of carrier material and sludge together with the combustion gases is deflected 180° and is passed into the space between the cylinders 12 and 13 through which space they pass in the direction of the arrows from right to left. At the left hand end of said space there takes place a renewed deflection of 180°, and the gases as well as the mixture, which is then completely dried, are passed by the fan 3 into the separator 4.

The drying in the drum 2 accordingly takes place according to the principle of specific weight, i.e. the most rapidly dried and consequently weight-relieved particles are continuously aspirated by the fan 3.

In the connecting pipe between the outlet of drum drier and the inlet of the fan, a regulator thermostat 22 is built in, which on the one hand automatically controls the fuel supply to the furnace 1, and on the other hand automatically controls the dosage device of the charging means 8, in order that the plant may always be supplied with hot gases of the right temperature and with the amount of mixture required.

While I have described herein and illustrated in the accompanying drawing what may be considered a typical and particularly useful embodiment of a plant according to my said invention, I wish it to be understood that I do not limit myself to the particular details and dimensions described and illustrated; for obvious modifications will occur to a person skilled in the art.

What I claim as my invention and desire to secure by Letters Patent, is:

1. In a method for the drying of wet sewage sludge, the steps of mixing the wet sludge with sawdust, passing the wet mixture thus obtained into the path of a confined stream of hot combustion gases thereby causing rapid evaporation of the major portion of the wet contents of the mixture, separating the dried sawdust from the dried sludge by sifting, and mixing said dried sawdust with consecutive fresh charges of wet sewage sludge thereby establishing a continuous recycling of the sawdust.

2. The method as set forth in claim 1, including the step of using at least a portion of the dried sifted sludge as an ingredient in fuel producing said hot combustion gases.

3. The method as set forth in claim 1, including the step of discharging at least a portion of said dried sifted sludge for use as a fertilizer.

4. A plant for drying wet sewage sludge, comprising in combination a furnace, a drier drum having an inlet and a discharge end, means connecting the inlet of said drier drum with said furnace for supplying hot combustion gases from the furnace to the drier drum, a mixer for mixing sawdust with the wet sewage sludge, charging means communicating with said mixer and with said drier drum for transferring the mixture of sawdust and sludge from said mixer to said drier drum, separating means at the discharge end of said drier drum for separating the dried mixture of sludge and sawdust from the combustion gases and water vapor emerging from said drier drum, a vibrator sieve for sifting said dried mixture to separate the dried sludge from the dried sawdust, and means for returning said dried sawdust to said mixer thus completing a recycling system for repeatedly using the same sawdust.

References Cited

UNITED STATES PATENTS

| | | |
|---|---|---|
| 678,924 | 7/1901 | Wood. |
| 2,040,416 | 5/1936 | Upson _____ 110—8 |
| 2,102,427 | 12/1937 | Lloyd et al. _____ 110—8 |
| 2,213,668 | 9/1940 | Dundas et al. _____ 110—15 |

FOREIGN PATENTS

| | | |
|---|---|---|
| 1,018,571 | 1/1966 | Great Britain. |
| 400,425 | 2/1968 | Switzerland. |

JAMES W. WESTHAVER, *Primary Examiner.*